United States Patent [19]

Petetrot et al.

[11] Patent Number: 4,505,873
[45] Date of Patent: Mar. 19, 1985

[54] METHOD FOR REGULATING THE POWER SUPPLIED TO A STEAM TURBINE/PRESSURIZED WATER NUCLEAR REACTOR

[75] Inventors: Jean-Francois Petetrot, Paris, France; Pierre Parent, Champaign, Ill.

[73] Assignee: Framatome & Cie, Courbevoie, France

[21] Appl. No.: 235,878

[22] Filed: Apr. 3, 1981

[30] Foreign Application Priority Data

Feb. 15, 1980 [FR] France .................. 80 03433

[51] Int. Cl.³ .................. G21C 7/36
[52] U.S. Cl. .................. 376/216; 376/211; 376/219; 376/297; 60/644.1
[58] Field of Search ........... 376/207, 210, 216, 219, 376/211, 297; 60/644.1

[56] References Cited

U.S. PATENT DOCUMENTS 3,932,213 1/1976 Musick ................... 376/216
4,326,917 4/1982 Kelly ..................... 376/216

Primary Examiner—Donald P. Walsh
Attorney, Agent, or Firm—Pollock, Vande Sande & Priddy

[57] ABSTRACT

A method for regulating the power supplied to a steam turbine by a pressurized water nuclear reactor driving an electric current generator supplying a network by utilizing the movement of control rods in the reactor and the by-passing of a fraction of the steam produced by the reactor out from the turbine circuit. In the case of electrical uncoupling between the generator and the network or load rejection, the parameter determining the position of the control rods is selected as the greater of two values of a reference temperature. The by-passing of the steam is kept in operation and the operation of the reactor remains automatic. The opening signal for the by-pass valves is modified by a gain signal determined from a signal representing the power level. The invention is particularly applicable to the regulation of the power of pressurized water nuclear power stations.

5 Claims, 1 Drawing Figure

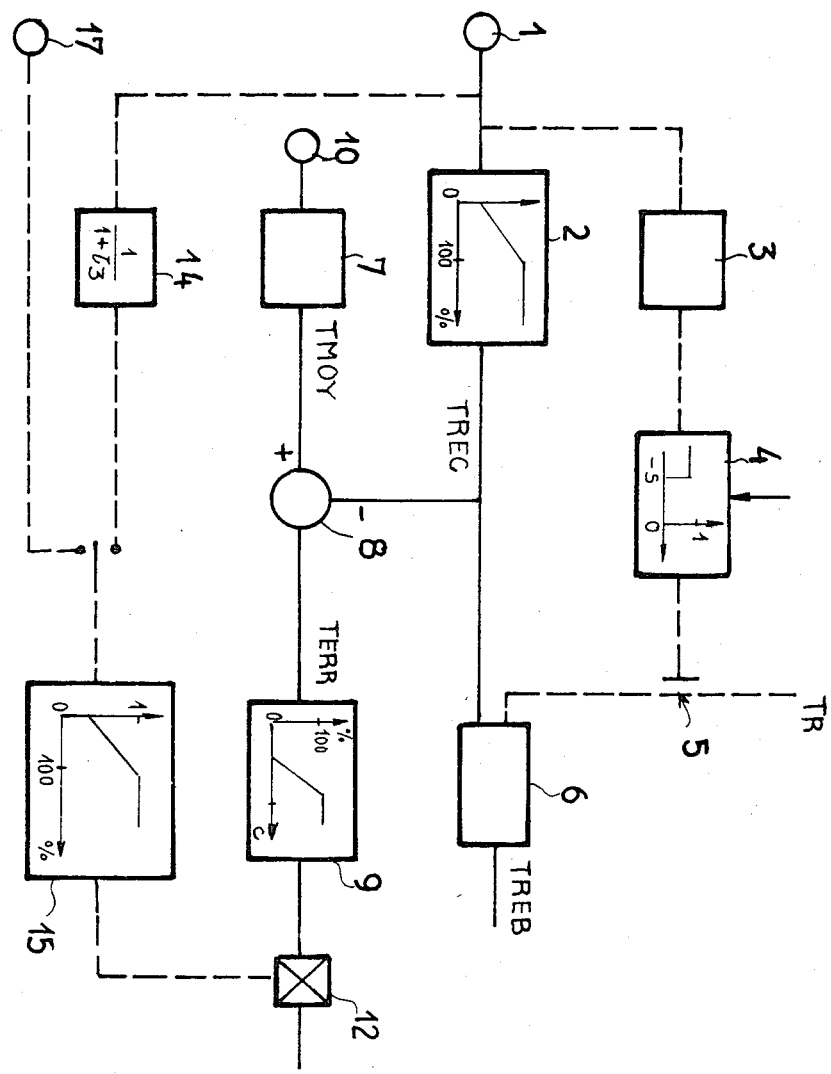

METHOD FOR REGULATING THE POWER SUPPLIED TO A STEAM TURBINE/PRESSURIZED WATER NUCLEAR REACTOR

BACKGROUND OF THE INVENTION

The invention relates to a method for regulating the power supplied to a steam turbine by a pressurized water nuclear reactor driving an electrical generator supplying a network.

In pressurized water nuclear power stations used for the generation of electric current, steam is produced by heat exchange between the primary fluid constituted by water under pressure and the secondary fluid constituted by water which is converted into steam inside the steam generators.

The steam is used as a driving fluid for the turbine which actuates the electric current generator.

The electric power demanded by the network can be variable in the course of time, so that the power that the nuclear reactor must supply to the turbine may itself be essentially variable in the course of time. On the other hand, it is sometimes necessary to disconnect the current generator from the network for a longer or shorter time for a reason independent of the operation of the nuclear power station itself. In this case, the power demanded by the turbine is extremely low since it then suffices to supply the electrical power necessary for feeding the auxiliary circuits of the power station, the discharging network being disconnected. Generally, this residual power only represents about 5% of the rated power of the power station.

It is known that the operation of nuclear reactors to follow a given power program uses neutron-absorbant rods which are moved in the core of the reactor according to the power demand program.

However, in the case of considerable and rapid power variations to respond to the demand of the network, or in the case of electrical disconnection between the power station and the network, this operation being called load-rejection, it is necessary to have an additional regulating means for the power supplied by the steam turbine nuclear reactor.

The pressurized water nuclear power stations therefore include a steam by-pass system which permits an artificial load to be created capable of absorbing the excess power from the nuclear reactor. This artificial load is obtained by releasing steam tapped upstream of the turbine either to the atmosphere, or to the condenser.

Steam by-pass systems permit negative variations in the load of the turbine, of amplitude greater than 10% of the rated load, or a variation in the time of this load on the turbine, with a negative slope greater than 5% of the rated load per minute.

When the power program requires variations in load of smaller amplitude, compensation is effected only by movement of the control rods.

The by-pass systems also enable excess power to be absorbed on sudden reduction of power from the rated power to the power necessary for supplying the auxiliary circuits, namely, approximately 5% of the rated power, on load-rejection producing switching off of the turbo-generator unit without emergency shutdown of the nuclear reactor.

In the case of an emergency shutdown of the reactor, the by-pass system also serve for removing the heat and energy stored in the primary circuit and for bringing back the power station to zero load conditions, without it being necessary to open the safety valves of the steam generators.

The by-pass systems are constituted by valve units positioned in the secondary circuit of the reactor upstream of the steam inlet to the turbine. These valves are actuated electrically by means of an opening signal formed from measuring signals representing the values of certain parameters representing the load condition of the turbine or of the reactor.

The parameters used may be homogeneous with temperatures or with pressures and, as the case may be, one speaks of temperature-mode or pressure-mode regulation.

A conventional temperature-mode regulation method uses a pressure measurement on the first wheel of the turbine and forms from the signal representing this measurement a signal representing a parameter homogeneous with a temperature called reference temperature. This reference temperature is used for the regulation of the displacements of the control rods and also serves as a reference temperature for the by-pass control.

On the other hand, the average temperature in the primary circuit of the reactor is measured, and from the difference between the by-pass reference temperature and the average temperature of the primary circuit compensated by an advance-retard filter, an error signal is determined which is converted by a function generator into an opening signal for the by-pass.

When isolation of the power station is effected, the power of the reactor must be brought back from the rated power to a very low power just sufficient to maintain the supply of the auxiliary circuits.

This power is of the order of 5% of the rated power in the majority of cases.

The reactor is then controlled by means of the control rods to supply this power to the turbine, the by-pass valves being closed since the reference temperature of the by-pass is identical with the reference temperature for the operation of the reactor.

For such a low power demand from the reactor, the automatic power regulation cannot be placed in service and the operator must take control of the reactor manually, as soon as the power is less than a certain threshold.

On the other hand, when the connection with the network is restored, the power of the reactor must increase in the same way as the power supplied to this network during the increase in power.

This method of operation obviously has drawbacks.

SUMMARY OF THE INVENTION

Accordingly, it is an object of the invention to provide a method for regulating the power supplied to a steam turbine by a pressurized water nuclear reactor driving an electric generator supplying a network, by the displacement of control rods absorbing neutrons in the core of the reactor and by by-passing a fraction of the steam produced by the reactor out from the turbine circuit by opening by-pass valves, the movement of the control rods being determined as a function of a parameter homogeneous with a temperature and called reference temperature, formed from a signal representing the load of the turbine, although the opening of the by-pass being determined by the difference between the reference temperature and the actual average temperature in the primary circuit of the reactor, this regulating method having to permit the maintenance of automatic regulation of the power of the reactor in all cases, and of effecting more rapid increases in power of the turbine after isolation of the power station.

For this purpose, in the case of electrical uncoupling between the generator and the network, or load rejection, the parameter determining the position of the control rods is selected as the higher of two values of the reference temperature, one being the temperature determined from the signal representing the load of the turbine, the other a predetermined temperature defining the power level at which the reactor is maintained so that the functioning of this reactor may remain automatic, in the case of load rejection, the by-passing of the steam remaining in operation and on the other hand the opening signal for the by-pass valves is modified by a gain signal determined from a signal representing the power level, to attenuate the effects of temperature variations in the reactor, on the opening signal for these valves.

In order that the invention may be more clearly understood, there will be described by way of non-limiting example, with reference to the accompanying drawing, one embodiment of the method of regulation according to the invention applied in a nuclear generating station comprising a pressurized water reactor.

BRIEF DESCRIPTION OF THE DRAWING

The drawing shows diagrammatically the various members necessary for the regulation of the power supplied by the turbine reactor.

DETAILED DESCRIPTION

A pressure sensing device 1 on the first wheel of the turbine provides a signal proportional to this pressure to a function generator 2 which forms from this signal a signal proportional to the reference temperature of the by-pass (T R E C).

By way of example, a function generator is shown which provides a signal proportional to the load of the turbine measured by the pressure on the first wheel, for values corresponding to a load between 0 and 100%.

Upstream of the function generator 2, the signal representing the pressure on the first wheel of the turbine is sent to a discriminating filter 3 whose function is to detect load-rejection which is manifested by a very rapid variation of large amplitude of the load on the turbine. When the filter 3 detects load-rejection, a signal is sent to the bi-stable relay 4 which then actuates a contact 5.

The time delay of the filter 3 is optimized so as to avoid triggering the relay 4 for faults of short duration which do not actually correspond to a load-rejection.

On the other hand, the relay 4 comprises a threshold S which enables only load-rejections triggered from a certain power level to be taken into account.

The closing of the contact 5 enables a signal representing a preset temperature TR to be sent to the first channel of a maximum selector 6.

The second channel of this maximum selector 6 receives the signal representing the reference temperature TREC.

When load-rejecting is detected, the maximum selector 6 enables the maximum value to be selected between the temperature TR and the temperature TREC, this maximum value serving as a reference temperature for the operation of the reactor with the control rods. It is this temperature TREB which is used for the automatic operation of the reactor.

In the case where the contact 5 is open, the reference temperature TREB is identical with the reference temperature TREC, as in the case of the prior art.

Temperature detectors 10 enable measurement of the average temperature of the primary circuit of the reactor and the signal representing this average temperature is received by an advance-retard filter 7 which enables the emission of the signal T MOY which is sent to a subtracter 8 which permits the subtraction of the signals corresponding to the average temperature of the primary circuit and the reference temperature to be effected. In this way an error signal T ERR is formed equal to T MOY minus T R E C. This error signal T E R R is sent to a function generator 9 which forms a signal proportional to the error signal which constitutes the opening signal for the by-pass.

The signal representing the pressure on the first wheel of the turbine is on the other hand by-passed upstream of the generator 2 to a filter 14 having a time constant $\tau$. At the output from this filter 14, the signal is processed by a function generator 15 which forms a gain reduction signal which is sent to a multiplier 12 which forms from the opening signal of the by-pass and of the gain, a modified signal which is used for controlling the opening of the by-pass valves.

When the load on the turbine varies from 0 to 100%, it is possible, for example, to vary the gain linearly between 0.5 and 1, by means of the function generator 15 shown in the drawing.

TR, the preset temperature, is selected in the case of load rejection, so that the power of the reactor is regulated to a value of the order of 30% of the rated power, which permits the power regulation to be effected automatically. However, the action of the rods then causes variations in the average temperature in the primary circuit, within the band-width permitted for these variations, which would cause considerable variations in the flow of the by-pass if the gain preserved the fixed value assuring full opening of the by-pass, at the beginning of load rejection, from the rated load.

The forming of a signal of variable gain as a function of the load enables this drawback to be avoided while keeping a considerable gain permitting the full opening of the by-pass at the beginning of load-rejection effected from the rated load.

The time constant of the filter 14 must be large to avoid rapid reduction in the gain at the beginning of load-rejecting, but it must permit the gain to follow the variations in load (for example 5% by minute).

A value enabling these contradictory requirements to be reconciled was selected the case of the embodiment; this value is $\tau = 200$ s.

It is seen that the principal advantages of the method according to the invention are to permit the maintenance of automatic regulation of the reactor power in the case of load-rejecting the power station and the use of steam by-passing during load-rejection with good conditions of stability.

On the other hand, when the connection of the power station to the network is restored, the power supplied to the network can increase more rapidly, since by closing the steam by-pass valves, there is added to the increase in power of the nuclear reactor the increase in power deriving from the recycling of steam into the circuit of the turbine.

The invention is not limited to the embodiment which has just been described, but encompasses all modifications.

Thus, while in the described embodiment the gain of the by-pass signal is linearly variable between 0.5 and 1, when the load passes from 0 to 100%, it is also possible to conceive other variations in this gain, as a function of the load. For example, it is possible to limit the linear variations of the gain between 0 and a certain power threshold beyond which the gain is kept constant.

On the other hand, the gain signal as described was formed from a measurement of the pressure on the first wheel of the turbine determining the load of this turbine, but it is also possible to form a gain signal from a measurement of the neutron flux produced in the reactor with detectors 17.

The invention is applicable to pressurized water reactor nuclear power stations whatever their other characteristics and their mode of operation.

We claim:

1. Method for regulating the power supplied to a steam turbine by a pressurized water nuclear reactor driving an electrical generator feeding a network, by displacements of the neutron-absorbing control rods in the core of said reactor, and by by-passing a fraction of the steam produced by said reactor out from the turbine circuit by opening by-pass valves, the displacement of said control rods being determined as a function of a parameter homogeneous with a reference temperature, formed from a signal representing the load on said turbine, the opening of said by-pass being determined by the difference between said reference temperature and the actual average temperature in the primary circuit of said reactor, said method comprising the steps of (a) automatically detecting the eventual occurrence of very rapid and large amplitude variation of the load on said turbine, of the type occurring upon uncoupling of said generator and said network, or load rejection;

(b) upon detection of such load variation, selecting the parameter determining the position of said control rods as the larger of two values of said reference temperature, one of said values being the reference temperature determined from said signal representing the load on said turbine, the other of said values being a predetermined temperature defining a power level of said reactor sufficiently high to permit automatic control of the power of said reactor through said control rods;

(c) modifying the opening signal for said by-pass valves by a gain signal determined from a signal determined from a signal representing the power level, to attenuate the effects of variations in temperature in said reactor, on the signal for opening said valves; and (d) maintaining control of the opening of said by-pass valves by the modified opening signal.

2. Regulating method according to claim 1, wherein the reference temperature is determined from a signal representing the pressure on the first wheel of the turbine.

3. Regulating method according to claim 2 or 1 wherein the gain signal modifying the opening signal of the by-pass valves is formed from a signal representing the pressure on the first wheel of the turbine.

4. Regulating method according to claim 3, wherein the signal representing the pressure on the first wheel of the turbine is modified by a delay filter to avoid rapid modification of the gain at the beginning of load-rejection.

5. Regulating method according to claim 2 or 1 wherein the gain signal modifying the opening signal of the by-pass valves is formed from a signal representing a measurement of neutron flux in the nuclear reactor.

* * * * *